J. C. WILLIAMS.
Seed-Planter and Guano Distributer.
No. 208,657.　　　　　　　　Patented Oct. 1, 1878.
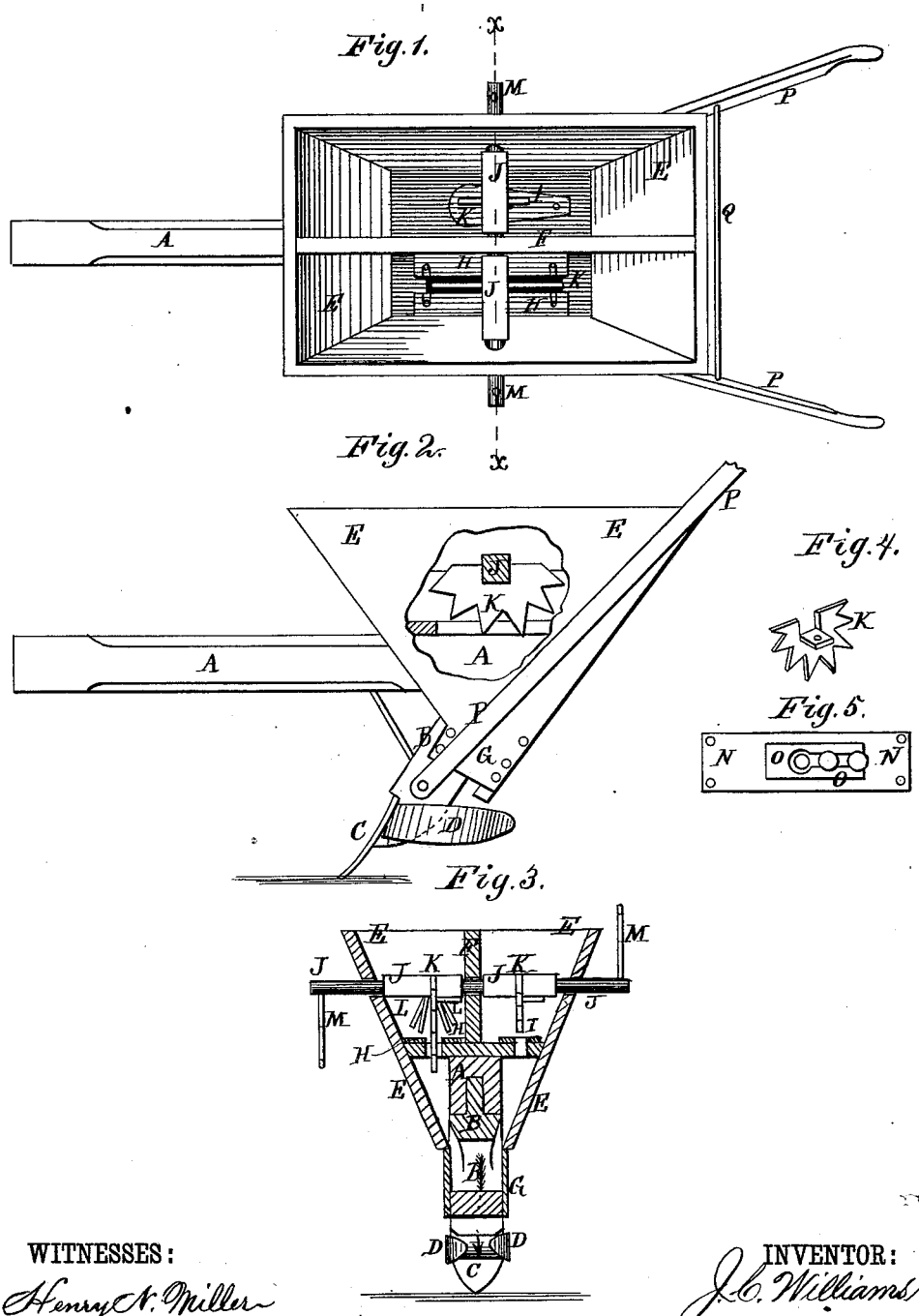
WITNESSES:
Henry N. Miller
C. Sedgwick
INVENTOR:
J. C. Williams
BY Munn & Co
ATTORNEYS.

UNITED STATES PATENT OFFICE.

JULIUS C. WILLIAMS, OF THOMASTON, GEORGIA, ASSIGNOR TO HIMSELF AND S. B. PRITCHARD, OF SAME PLACE.

IMPROVEMENT IN SEED-PLANTER AND GUANO-DISTRIBUTER.

Specification forming part of Letters Patent No. 208,657, dated October 1, 1878; application filed February 1, 1878.

*To all whom it may concern:*

Be it known that I, JULIUS C. WILLIAMS, of Thomaston, in the county of Upson and State of Georgia, have invented a new and useful Improvement in Combined Cotton-Seed Planter, Grain-Drill, and Guano-Distributer, of which the following is a specification:

Figure 1 is a top view of my improved machine. Fig. 2 is a side view of the same, part of the hopper being broken away. Fig. 3 is a cross-section of the same, taken through the line $x$ $x$, Fig. 1. Fig. 4 is a perspective view of one of the stirrers. Fig. 5 is a detail view of one of the bottom plates.

Similar letters of reference indicate corresponding parts.

The object of this invention is to furnish an improved machine for planting cotton-seed or other seeds, either alone or with guano, or for distributing guano alone, which shall be simple in construction, inexpensive in manufacture, convenient in use, and effective and reliable in operation, so that it may be used upon rough or uneven land.

The invention consists in the construction and combination of parts, which will be hereinafter more fully described, and then set forth in the claim.

A is the beam, to the rear end of which is attached the standard B. To the forward side of the lower end of the standard B is attached a plow-plate, C, to open a furrow to receive the seed. To the opposite sides of the lower end of the standard B are attached two plates, D, which are curved outward, inward, and rearward into such a shape and position as to fill the furrow opened by the plow C and cover the seed. To the rear part of the beam A and to the upper part of the standard B is attached the hopper E, which is provided with a bottom resting upon the top of the rear part of the beam A. The hopper E is divided into two compartments by the partition F, which should be detachable. In the bottom of the left-hand compartment, which is designed to receive cotton-seed, is formed a longitudinal slot, through which the seeds are fed to the spout G, attached to the rear side of the standard B, and pass down into the furrow opened by the plow C. In the bottom of the right-hand part of the hopper, which is designed to receive the guano, is formed a hole, through which the guano passes into the spout G, and thence into the furrow.

The slot in the bottom of the cotton-seed compartment is partially covered by two parallel plates, H, which are slotted transversely to receive the screws or bolts by which they are secured to the bottom of the hopper E, so that, by loosening the said screws or bolts, a larger or smaller discharge-opening may be formed, according as more or less seed is to be planted. In the bottom of the other or guano compartment of the hopper E is formed a round hole, which is covered by a plate, I, having an oblong hole formed through it, so that the discharge-opening may be regulated to distribute more or less guano by adjusting the said plate I. In the sides of the hopper E, and in the partition F, works a shaft, J. To the lower side of the shaft J, directly over the discharge-openings, are attached semicircular disks or plates K, the convex edges of which are serrated to force the seed and guano out through the said discharge-openings.

The toothed disk K in the cotton-seed compartment is made so large that it works in the discharge-slot. The toothed disk K in the guano-compartment is made smaller, so as to not quite reach to the plate I. To the shaft J, within the cotton-seed compartment and upon both sides of the plate K, are attached pins L to tear the cotton-seed apart and keep it stirred up. To the ends of the shaft J are rigidly attached arms M, one of which may project upward and the other downward, as shown in Fig. 3. To the outer ends of the arms M are designed to be attached the rear ends of two straps, the forward ends of which are designed to be attached to the fore legs of the horse or horses that draw the machine, so that the stirrers may be operated by the movements of the horse or horses in walking.

To plant cotton-seed and guano at the same time, the machine is arranged as hereinbefore described. To plant cotton-seed alone, the partition F and the guano-stirrer are removed, and the entire hopper is used for the seed. To distribute guano alone, the partition F and the cotton-seed stirrer are removed, and the slot in the bottom of the hopper is covered with a plate, N, so that the entire hopper can be used for guano.

To drill wheat or other grain with cotton-seed, the machine is arranged as first described. To drill grain with guano, the cotton-seed stirrer is removed and replaced by a smaller stirrer, and the discharge-opening is covered with the plate N. One compartment is then used for the grain and the other for the guano. The plate N has a discharge-hole formed through it, the size of which is regulated by a slide, O, attached to the said plate N.

P are the handles, the lower ends of which are attached to the opposite sides of the lower part of the standard B. The handles P are attached to the upper rear parts of the sides of the hopper E, and their upper parts are connected by a round, Q.

I am aware that it is not new, broadly, to journal a transverse shaft with stirring-arms in a hopper, said shaft carrying a crank at each end, from which proceed straps attached to the fore legs of the draft-animal, which in walking rocks the seed-agitator; and I therefore lay no claim to such invention.

I am also aware that adjustable slides over the seed-exits in hoppers and stirrers in the latter have heretofore been employed; and I therefore lay no claim to such stirrers and adjustable slides.

Having thus described my invention, I claim as new and desire to secure by Letters Patent—

The partitioned hopper F, having seed and guano exits leading into a common spout, G, the exits being provided with adjustable plates H I, in combination with the rock-shaft J, having arms M for the attachment of straps, stirrer-pins L, and two semicircular serrated feed-disks, K K, one of which extends below the exit of the seed-compartment, and the other disk only to the mouth of the exit in the guano-compartment, all constructed and arranged to operate in the manner and for the purpose set forth.

JULIUS CÆSAR WILLIAMS.

Witnesses:
  JOHN H. PICKARD,
  ROBT. F. PATTILLO.